March 1, 1949.

W. M. WIDGERY ET AL 2,463,487

PRESSURE CONTROL APPARATUS FOR AIRCRAFT
PRESSURE CABINS AND THE LIKE

Filed Aug. 28, 1947

Inventors
WILLIAM MACEY WIDGERY,
STANLEY THOMAS ALBERT RICHARDS

March 1, 1949.

W. M. WIDGERY ET AL 2,463,487

PRESSURE CONTROL APPARATUS FOR AIRCRAFT
PRESSURE CABINS AND THE LIKE

Filed Aug. 28, 1947

Inventors
WILLIAM MACEY WIDGERY,
STANLEY THOMAS ALBERT RICHARDS
By
Attorneys

Patented Mar. 1, 1949

2,463,487

UNITED STATES PATENT OFFICE 2,463,487

PRESSURE CONTROL APPARATUS FOR AIRCRAFT PRESSURE CABINS AND THE LIKE

William Macey Widgery and Stanley Thomas Albert Richards, Yeovil, England, assignors, by mesne assignments, to The Garrett Corporation, Los Angeles, Calif., a corporation of California Application August 28, 1947, Serial No. 770,978 In Great Britain November 6, 1941

Section 1, Public Law 690, August 8, 1946 Patent expires November 6, 1962

44 Claims. (Cl. 98—1.5)

This invention relates to pressure control apparatus for aircraft pressure cabins or like spaces provided with a source of air supply under pressure.

This application is a continuation of applicants' co-pending application Serial No. 475,144, filed February 8, 1943, which is now abandoned.

It is an object of the present invention to provide a pressure control apparatus or pressure regulator for controlling the pressure within an aircraft cabin and embodying valve means for controlling the flow of air through an opening and including a movable pressure sensitive device responsive to the differential between the pressure of the air in said cabin and the air pressure in a control chamber, the pressure in said control chamber being under the control of a pressure responsive element which is responsive to control chamber pressure, for controlling the pressure in said control chamber, and which, in its controlling operation, is required to handle only a small quantity of air as compared to that handled by the flow control valve.

More particularly, there is connecting means for connecting the control chamber with air from a source of higher pressure and connecting means connecting said chamber with a region or zone of lower pressure, and said pressure responsive element controls flow through one of said connecting means.

The invention is particularly, though not exclusively, directed to apparatus of this nature for use in conjunction with military aircraft furnished with pressure cabins.

In such aircraft certain desiderata exist that may differ somewhat from those arising in commercial aircraft and the most important are:

(1) The apparatus for regulating the pressure in the cabin should be very simple and light and sufficiently robust to withstand all likely conditions of aircraft service including such conditions as sandstorms.

(2) Operation of the regulating apparatus should be entirely automatic so as not to entail any thought or action on the part of the pilot during the course of the aircraft's climb or descent; the pilot often cannot anticipate the course of his aircraft or allow time to readjust any part of the control apparatus.

(3) When the pressure cabin commences to be pressurized, this pressure should rise relatively slowly even if the altitude is above that at which the differential pressure (between inside and outside) would normally begin, such as would be the case if the pilot had left the sliding coupe of his cabin open up to a considerable altitude and then felt the need for pressurizing.

Another object of the present invention is to provide pressure space control apparatus enabling the above desiderata to be realized.

Still another object of the invention relates to the provision of a device of this character, of simple and inexpensive construction which is light in weight and dependable in operation.

Further objects and advantages of the invention will appear from the following part of the specification.

Referring to the accompanying drawings.

Figure 1:
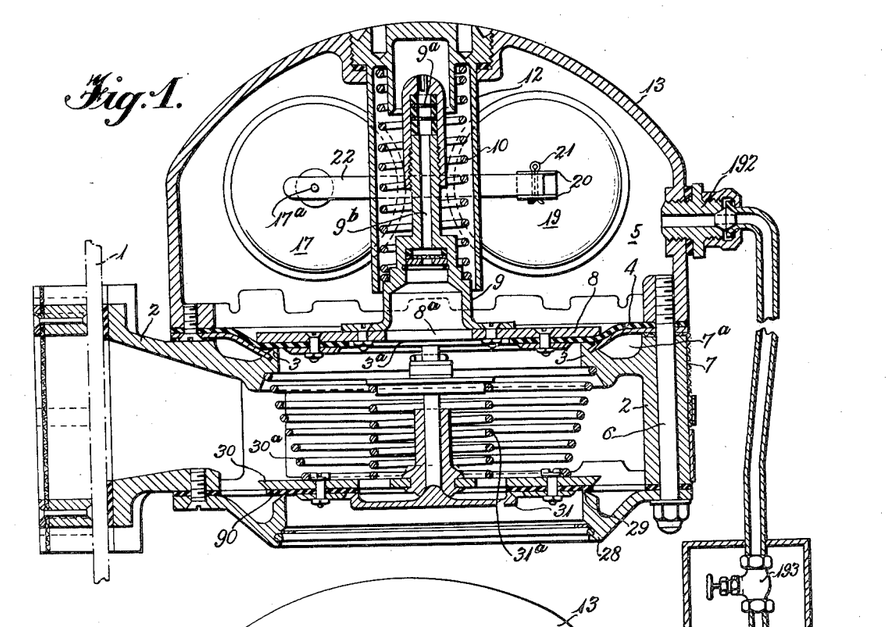
Figure 1 is a vertical sectional view of a pressure cabin control apparatus embodying the invention.
Figure 2:
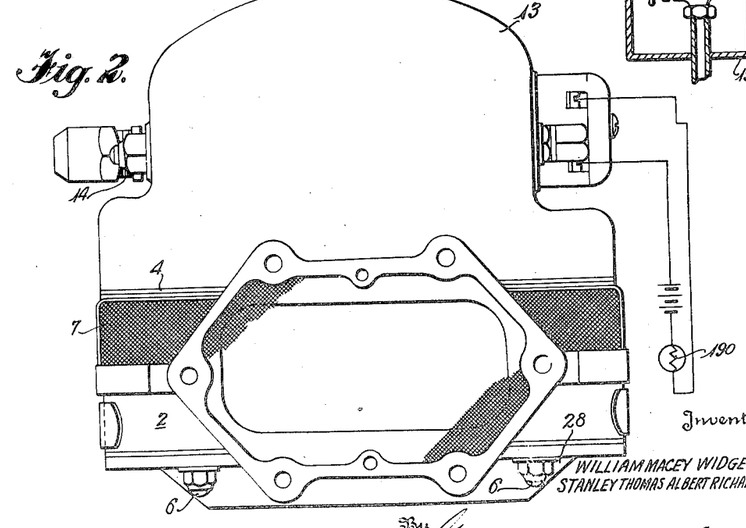
Fig. 2 is an end elevation view thereof.
Figure 3:
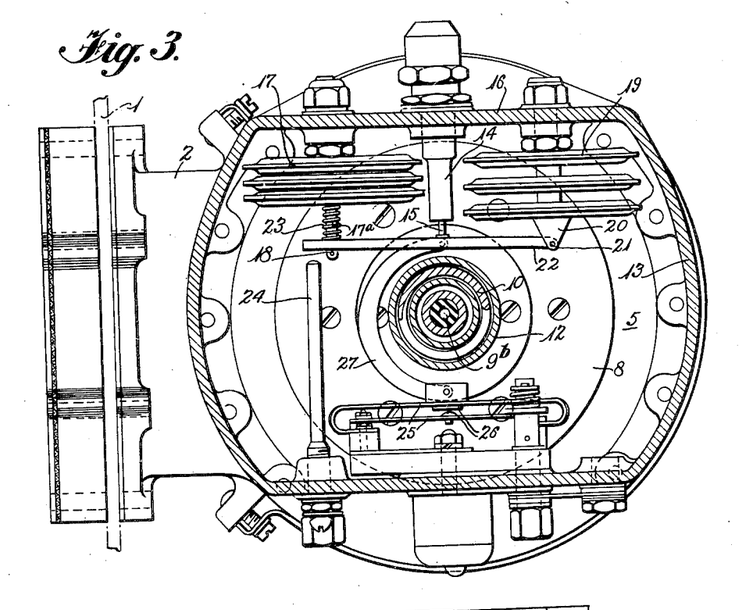
Fig. 3 is a transverse sectional view thereof.

In carrying the invention into effect according to one convenient form by way of example as illustrated in Figures 1 to 3, the pressure cabin 1 of an aircraft has bolted to its rear face a light casing 2 which forms a valve body and a passage for air from the cabin to the atmosphere. This casing or valve body has a circular valve seat 3 adjacent its upper face, which is engageable by a combined movable valve and control member, shown as comprising a flexible diaphragm 4 (of rubber or other suitable material) which, when the valve is closed, is dished downwards, say 0.15", said diaphragm having a central opening 3a therein.

Above the diaphragm is a cast variable pressure or control pressure chamber 5 which is attached to the main body casting by means of bolts 6. Flow of air from the cabin between the valve seat and diaphragm is permitted when the latter lifts so that the air can then pass out to atmosphere through an annular port 7a covered with gauze 7.

Means is provided for controlling the pressure in the control chamber 5 which has a connection with a source of higher pressure (as cabin pressure for example), for a flow of air into said chamber from said source, and a connection with a region or zone of lower pressure (as atmosphere for example) for a flow of air from said chamber to said region or zone. One of said connections may be provided with a bleed opening of restricted effective area and the other connection is controlled by valve means. The valve means is controlled by an absolute pressure responsive device, responsive to control chamber pressure for controlling the pressure in said chamber. There may also be differential pressure responsive means for controlling said valve means, said differential pressure responsive means being responsive to variations in the differential between the pressure in the control chamber and atmospheric pressure. More particularly, the diaphragm carries on its upper face a ring 8 which is larger in diameter than the valve seat (say approximately 15% larger), said ring having a central opening 8a in register with the opening 3a in the diaphragm. Attached to said ring 8 is a stem 9 having a passage 9b therein communicating at one end with the registered openings 3a and 8a in the diaphragm 4 and ring 8 respectively. The other end of said passage 9b is provided with a leak or bleed hole 9a, said passage 9b and bleed 9a providing communication between the interior of the cabin 1 and the variable pressure or control pressure chamber 5. Thus there is a flow of air into the control chamber 5 from a source of higher pressure, which, in the present instance, is the aircraft cabin. This stem 9 has bearing upon it a spring 10, the upper end of which is in contact with a sleeve 12 rigid with the dome 13 of the variable pressure or control pressure chamber 5. The outlet for the chamber 5 comprises a valve, indicated generally at 14, comprising an outlet to a region of lower pressure, such as atmosphere, by way of a valve outlet opening or passage 14a in a valve tube 14b (Figures 3 and 3a).

The passage 14a is controlled by the valve 14c shown herein as a Schrader valve which is so arranged that when the operating pin 15 is pressed, by means to be described, the variable pressure chamber 5 is placed in communication with the outside air.

Figures 3A, 6, 7:
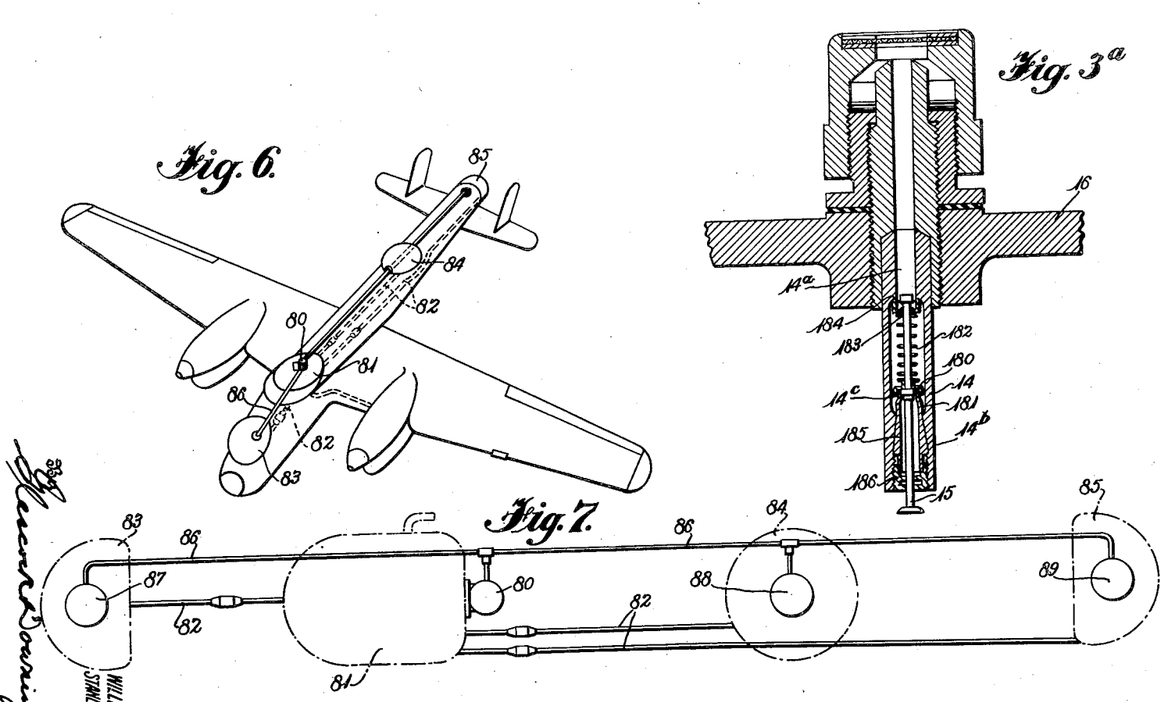
Fig. 3a is a sectional view of a detail thereof.
Figs. 6 and 7 are respectively perspective and diagrammatic views of an embodiment of the invention employing a master valve and three auxiliary valves.

The Schrader valve which is of common form or type is shown in Figure 3a. The stem 15 of said valve carries a valve member 180 embodying a resilient washer thrust upon a seating tube 181 by a spring 182. The spring 182 at one end bears against an abutment member 183 engaging a shoulder 184 on the tube 14b. The seating tube 181 is furnished with an external tapered surface which is thrust into air-tight engagement with a corresponding tapered internal surface 185 on the tube 14b by means of a screw threaded sleeve 186 which latter serves also to guide one end of the stem 15 the other end of which is guided by the abutment member 183.

The valve 14 may be of any other suitable character and the aforesaid bleed orifice 9a and said valve 14 comprise the only inlet and outlet respectively for the variable pressure or control pressure chamber 5.

To one side of the valve tube 14b is mounted a capsule or capsules forming a bellows 17, the interior of which is evacuated and the exterior of which is subject to the pressure in the chamber 5, said bellows 17 providing absolute pressure responsive means responsive to the control chamber pressure for controlling said valve 14 and hence the outflow of air from said control chamber, as will be more fully described hereinafter. On the other side of the valve tube 14b is mounted a capsule or capsules forming a bellows 19 the interior of which is subject to ambient atmospheric pressure and exterior of which is subject to the pressure in the control chamber 5, the bellows 19 thus providing differential pressure responsive means, responsive to variations in the differential of pressure between that in the control chamber 5 and atmosphere, for also controlling said valve 14 and hence the outflow of air from said control chamber. One end of each of the bellows 17 and 19 is secured to the vertical wall 16 of the control chamber 5. The movable end of the bellows 17 is provided with a stem 17a, which, near its extremity, has a vertical hole 18 drilled through for a pin, and the movable end of the bellows 19 carries a U-shaped fitting 20 and a vertical pin 21. This pin 21 supports a light horizontal beam 22, which bears near its center part against the operating pin 15 of the valve 14, and near the other end of the said beam is drilled a hole to encircle and, when necessary, to travel along the stem 17a of the bellows 17.

Over the stem 17a of the bellows 17, and between its movable face and the beam, a light coil spring 23 is provided and the beam is prevented from being forced off the stem by means of a pin through the hole 18 near the end of the stem.

When the cabin is sealed the exhaust of air from the cabin normally takes place past the valve seat 3 and through the port 7a to atmosphere. Since the diaphragm 4 has an effective area approximately 15% greater on the side exposed to the pressure in the control chamber 5 than on the side exposed to cabin pressure, air will pass out past the valve seat 3 only when the pressure in the cabin is slightly in excess of the pressure in the control chamber 5 which chamber thus controls the exhaust of air from the cabin.

A base member 28 (Figure 1) secured to the casing 2 embodies a seat 29 with which is associated an inwardly opening relief valve 30 carried on a flexible diaphragm 90 clamped between the base 28 and the casing 2. The valve 30 is adapted to open against a spring 30a when the pressure inside the cabin becomes less than outside, for example, during a dive. The valve 30 carries a safety valve 31 which may open outwardly against the action of the spring 31a to relieve pressure within the cabin should the diaphragm 4 become damaged or faulty.

The diaphragm 90 provides resilient material for taking up any slight irregularities in the face of the seat 29 or the face of the relief safety valve 31, said diaphragm having a plurality of holes arranged between the outer face of the valve 30 and the inside of casing 2, said holes being of such size as to allow enough diaphragm material between them to act as flexible arms for centralizing the valves relative to the casing 2. When the inwardly opening relief valve 30 is open, air passes between seat 29 and diaphragm 90 and then passes through the aforementioned holes in said diaphragm to the cabin.

In operation, at low altitudes and when no added pressure is required in the cabin, the arrangement is such that the operating pin 15 of the valve 14 is depressed by a small amount, say 0.05 inch, so that the chamber 5 is in communication with the atmosphere. Thus the pressures inside and outside the bellows 19 are the same and the bellows is in its position of rest which for this particular arrangement is that of full extension.

As the altitude of the aircraft increases to that at which the cabin is to begin to be pressurized, the reduction of atmospheric pressure on the exterior of the bellows 17 allows it to expand sufficiently to permit the beam 22 to swing about the pin joint 21 of the bellows 19 until at the desired altitude said beam has become just clear or nearly clear of the pin 15, thus closing the valve 14.

Since the outlet provided by the port 7a is not large the back pressure across the outlet will cause the pressure in the casing 2 to be slightly above atmospheric when the valve 4 is open and when the valve 14 has closed, as described above, so that the chamber 5 is no longer in communication with the atmosphere, this increase of pressure above atmospheric will be comunicated to the chamber 5 by the bleed orifice 9a. It is to be understood, of course, that in stating herein that the valve 14 is closed or opened, it does not necessarily mean that said valve is in the fully open or closed position, as said valve is positioned in accordance with the positioning of the bellows 17 and 19.

The valve 4 is subject to the pressure in the cabin 1 and the casing 2 for approximately 90% of its area, the other 10% being subject to the atmospheric pressure in the port 7a, so that, when the chamber 5 is in communication with atmosphere by way of the valve 14, the valve 4 will open whenever the cabin pressure is sufficient to overcome the force of the spring 10 and the pressure in chamber 5.

When the valve 14 is closed and the pressure on both sides of the valve 4 is the same, the whole of the upper face of the valve 4 is acted on by chamber pressure while only 90% of the lower face is acted upon by cabin pressure, so that the valve 4 will be closed by the excess of effective area of the pressure in the chamber 5 and also by action of the spring 10.

The valve 4 will remain closed until the pressure in the cabin 1 and the casing 2 is greater than that in the chamber 5 by an amount sufficient to offset both the difference of effective areas of the two sides of the valve, and the effect of the spring 10. Since the chamber 5 is in communication with the casing 2 by way of the bleed orifice 9a this cannot happen until the chamber 5 is once more in communication with the atmosphere, so that when the valve 14 is closed as described above, the valve 4 will also close and remain closed, allowing the pressure in the cabin and in the chamber 5 to be built up through the bleed orifice 9a by the cabin superchargers until the valve 14 is opened again by the combined action of the absolute and differential pressure responsive bellows 17 and 19 respectively.

The absolute pressure responsive bellows 17, however, has been responding to the increase in altitude and has extended sufficiently far to permit the beam to swing about the pin joint 21 of the bellows 19 to such an extent that the operating stem 15 of the valve 14 has become just clear or nearly clear of the beam 22. This permits pressure to begin to be built up in the variable pressure chamber 5.

Let us consider the case where cabin pressurizing is desired to start at a height of 10,000 feet (i. e. a pressure of 10 lb./sq. in.). The initial clearance between the beam and the stem 15 of the valve 14 is so arranged that the valve has just shut when the altitude of 10,000 feet is reached. As described above when the valve 14 closes the pressure in the cabin and in the control chamber is built up until the valve 14 is opened again by the combined action of the bellows 17 and 19.

Let the aircraft now climb to an altitude of 27,000 feet (i. e. a pressure of 5 lb./sq. in.) and let the pressure in the cabin be P lb./sq. in. when the valve 14 is just about to open again. Since the stem 15 of the valve 14 is in the same position the ends of the beam have pivoted equal amounts. The bellows 17 will have moved a distance corresponding to a pressure change from 10 to P lb./sq. in. The bellows 19 will have moved a distance corresponding to a change of differential pressure from 0 to P minus 5 lb./sq. in. Assuming that the bellows have the same expansion and contraction for a given change of pressure then (10 minus P) equals (P minus 5) and the pressure in the cabin is therefore 7½ lb./sq. in.

By the means described, therefore, while the actual altitude of the aircraft is approximately 27,000 feet (5 lb/sq. in. absolute), the apparent altitude as measured inside the cabin is only 17,000 feet (7.5 lb./sq. in. absolute).

By the means described, conditions inside the pressure cabin are much more convenient for the pilot than if he had no pressure cabin and the change of pressure differential in the cabin has been slowly built up while the aircraft has been ascending from 10,000 feet to 27,000 feet.

At an outside absolute pressure of 5 lb./sq. in. the beam 22 is restrained by means of a stop 24 adjacent to the pin of the bellows 17 so that this capsule no longer controls the operation of the valve 14. At altitudes above 27,000 feet the bellows 19 is in complete control.

In general the pressure in the control chamber 5 is, in fact, somewhat less than the pressure in the cabin and depends upon the relative effective surface areas of valve, diaphragm, etc.

Figure 4:
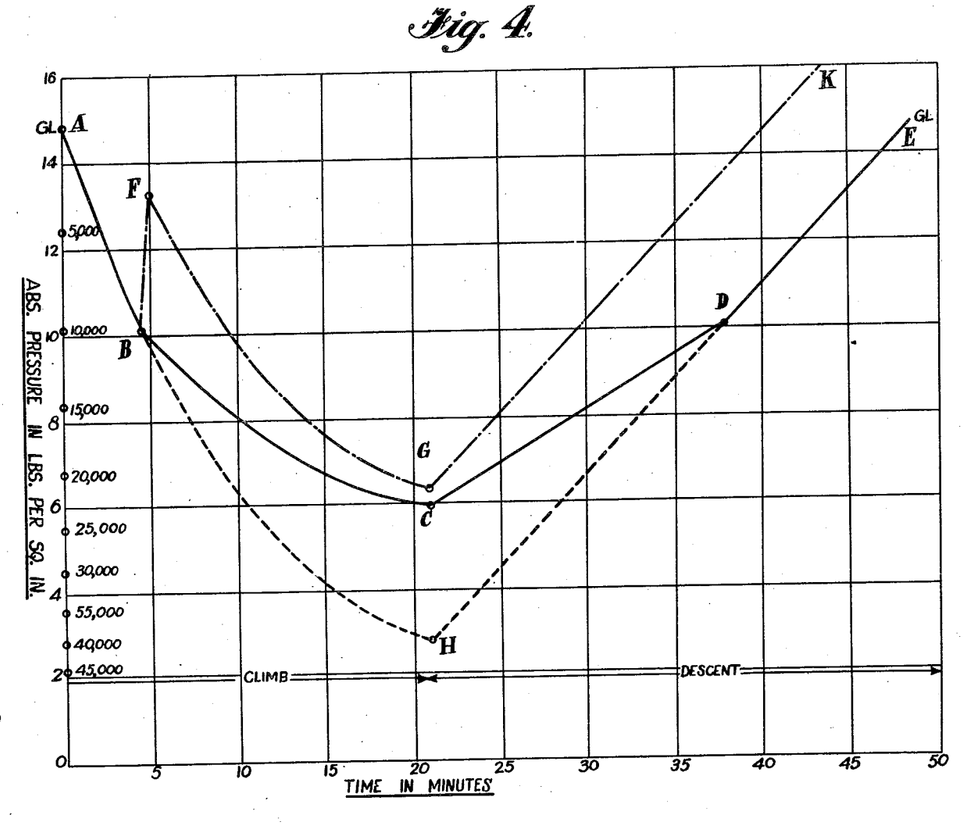
Fig. 4 illustrates in graphical form typical conditions existing in a flight employing apparatus according to Figures 1 to 3.

Fig. 4 illustrates in graphical form typical conditions obtaining in a flight employing apparatus according to Figures 1 to 3. In Fig. 4 the abscissa represents time in minutes and the ordinate absolute pressure in pounds per square inch, heights corresponding to the different pressures being also shown on the ordinate. A to B represents the variations of the pressure for a climb from ground level to 10,000 feet, the pressure inside the cabin during that period being the same as the outside atmosphere. At 10,000 feet the aeroplane continues to climb, say, up to 40,000 feet and the outside pressure around it varies following dotted lines BH. If the pilot's coupe were closed at 10,000 feet and the blower were delivering air to the cabin the pressure would increase as shown by line BF, if no control valve were fitted. If a safety valve were used, set at 3.5 lb./sq. in. above external pressure then the pressure in the cabin would follow line FG. If the aircraft were fitted with a pressure cabin control valve in accordance with Figures 1 to 3 the pressure in the cabin would follow that indicated by curve BC so that when the aircraft is at a height of 40,000 feet the pressure in the cabin corresponds to an altitude of about 23,000 feet.

Since the differential pressure CH is less than 3.5 lb./sq. in. the valve 14 will have been controlled between 10,000 feet and 40,000 feet by bellows 17 and the bellows 19 and will not have been at any time completely under control of the bellows 19 which, for the case considered, allows a differential pressure of 3.5 lb./sq. in. After the aircraft has attained a height of 40,000 feet, Fig. 4 shows the external pressure for slow descent HDE, giving the corresponding altitudes and pressures. If no control valve were fitted, but merely a safety valve set at 3.5 lb./sq. in. the pressure inside the cabin would follow line GK and this would mean that on the ground the cabin had an internal pressure of 3.5 lb./sq. in. greater than the surrounding air.

With the control valve, according to Figures 1 to 3, the pressure inside the cabin would approximately follow that indicated by line CD. Below point D which corresponds with 10,000 feet the pressure inside the cabin would be the same as that outside and would be indicated by DE.

From the foregoing it will be seen that by the use of the valve according to Figures 1 to 3 the air pressure in the cabin has been entirely automatically controlled during the climb and descent without any attention on the part of the pilot, and that above the chosen altitude of 10,000 feet the fall and rise of pressure has been considerably reduced below that corresponding with the change in altitude.

Figure 5:
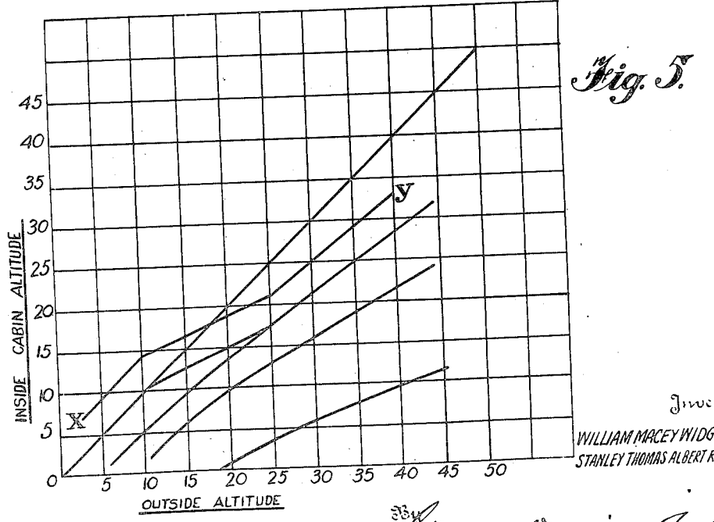
Fig. 5 illustrates in graphical form cabin pressure variations with variations in altitude.

Fig. 5 illustrates in graphical form cabin pressure variations with variations in altitude. The abscissa shows outside altitude and the ordinate the inside cabin altitude. Lines for differential pressures of 0, 2, 3.5 and 7.5 lb./sq. in. have been traced. The curve shows the variation of apparent cabin altitude with actual altitude for a given typical control valve setting. Up to 10,000 feet the pressures inside and outside are equal and then the differential pressure rises gradually to its final value of 2 lb./sq. in. at 25,000 feet. From there onwards the difference is constantly maintained. The altitude at which the pressurizing starts can be regulated by adjusting the distance of the valve 14 from the beam. The final differential pressure is regulated by adjusting the beam stop 24.

The curve $xy$ on the graph shows an adjustment of a warning light 190 (Fig. 2) to go on as soon as the pressure is more than 0.9 lb./sq. in. below that fixed by the control valve. In the example described above, the beam 22, in addition to controlling the stem 15 of the valve 14 also operates flexible strips 25 having silver contacts 26 by means of a C-shaped member 27 arranged to clear the sleeve 12. In normal operation these contacts 26 are open but can be adjusted (when the aircraft is on the ground) by means of screws communicating with the outside of the casing so that at any desired pressure below chosen pressure the warning device, such as a light or horn operates.

Adjustment is also provided for the valve 14 and for the stop 24, which prevents the bellows 17 from functioning above a certain height. If the valve 14 is given no interference with the beam 22 at ground level then the absolute pressure inside of the cabin will progressively fall with increase of altitude, but at a slower rate than that of the outside air, also, if the strength of the pressure cabin is adequate and the ceiling of the aircraft is not too great, then there may be no constant differential of pressure between the cabin and the outside air, but rather a continuous increase in differential from ground level to ceiling.

The leakage through the orifice in the stem 9 is determined by the size of the hole drilled in the orifice plate 9a. In some cases also a pipe coupling 192 may be provided from the control pressure chamber 5 to atmosphere so that by opening a valve 193 in the pilot's cabin 194 the air may be released from said chamber when desired to allow the valve 4 to open.

The bellows 17 and bellows 19 may have different stiffnesses due either to the number of capsules on each being different or their thickness of metal being different or there being additional means for stiffening the capsule such as an associated spring. By this means the rate of change of absolute pressure inside the cabin with change of altitude can be varied so as to be either more rapid or less rapid than in the example described with reference to Figures 1 to 3.

The bellows 19 may be so arranged that the atmospheric pressure acts on the outside thereof and control chamber pressure acts on the inside so that the natural position of the bellows is that of contraction; the arrangement of the beam in this modification may be similar to that previously described.

The valve 14 may be replaced by any small spring loaded valve having either a metallic or a non-metallic seating.

Figures 6 and 7 illustrate a typical convenient layout of an arrangement in which a master valve 80 with control chamber and capsules is disposed in the wall of the pressure cabin 81 and connections are made from the cabin by pipes 82 with a front turret 83, a fuselage turret 84 and a rear turret 85 whilst the variable pressure chamber of the valve 80 is connected by pipes 86 with valves 87, 88 and 89 disposed in the various positions as shown.

Conveniently the valve casing and variable pressure chamber as well as the valves themselves may be constructed of a plastic.

Having thus described our invention, we claim:

1. Pressure control apparatus for a closed space comprising in combination with means to supply pressure to said space, a casing connected to said space, a valve seating on said casing, a variable pressure chamber in communication with said space by way of a preset bleed opening, a flexible diaphragm closing one side of said chamber and subjected at its opposite side to the pressure of said closed space, said diaphragm co-acting with said seating to form a discharge valve for said space actuated when pressure in said closed space differs by a predetermined amount from that in said chamber, a small air release valve in said chamber, an absolute pressure responsive unit in said chamber, a differential pressure responsive unit in said chamber and a movable beam in said chamber, said former unit being sealed and subject to the pressure in said space, said latter unit being subjected externally to the pressure in said chamber and internally to the pressure of the ambient air and the said beam being connected at its respective ends to said units and co-acting at an intermediate point with said small valve, and a preset stop in said chamber co-acting with the end of the beam connected to said first-mentioned unit.

2. Pressure space control apparatus as claimed in claim 1, wherein said preset bleed opening comprises an orifice plate.

3. Pressure space control apparatus as claimed in claim 1 including also a warning device, an electric switch for controlling the circuit of said warning device and a mechanical connection between said movable beam and said switch.

4. Pressure space control apparatus as claimed in claim 1 including a further seating formed from a portion of said casing, an inward-relief valve co-acting with said further seating, a pre-loaded spring which bears at one end against the inner face of said inward-relief valve and at the other against said casing, said inward-relief valve being opened by atmospheric pressure acting on its external surface to admit air into said closed space whenever said atmospheric pressure exceeds pressure in the said closed space by a chosen amount, and including also a seating formed from a portion of the said inward-relief valve, an outward-relief valve co-acting with said seating, a stem on said outward-relief valve, a pre-loaded spring abutting at one end said stem and at the other the inner face of said inward-relief valve, said outward-relief valve being caused to open when the pressure in the said closed space exceeds the atmospheric pressure by a predetermined amount.

5. In mechanism for controlling the pressure within an aircraft cabin: cabin pressure control means operable to control the pressure in said cabin, including a movable pressure sensitive control element subjected on one side to cabin pressure; walls defining a control pressure chamber, the other side of said control element being subjected to pressure in said chamber; a connection between said chamber and a source of higher pressure; a connection between said chamber and a region of lower pressure; a valve controlling one of said connections; and a device responsive to the pressure in said control chamber for controlling said valve and thereby controlling the pressure in said chamber.

6. In mechanism for controlling the pressure within a pressurized aircraft cabin: cabin pressure control means operable to control the pressure in said cabin, including a movable pressure sensitive control member subjected one one side to cabin pressure; walls cooperating with the other side of said control member to define a control pressure chamber; a connection between said chamber and a source of higher pressure; a connection between said chamber and a region of lower pressure, one of said connections being of a fixed restricted area; a valve controlling the other of said connections; and a device responsive to control chamber pressure for controlling said valve.

7. A mechanism for controlling the pressure within a pressurized aircraft cabin, comprising: walls defining a control pressure chamber, one of said walls being movable and comprising a pressure sensitive device having associated therewith valve means for controlling flow of air from said cabin, said device being subjected on one side to the pressure in said chamber and on the other side to cabin pressure; a restricted bleed connecting the control chamber with the cabin; a conduit connecting the control chamber with ambient atmosphere; a valve controlling said conduit; and a pressure responsive element operably connected to said valve for controlling the same, said element being responsive to control chamber pressure.

8. In mechanism for controlling the pressure within an enclosure: walls defining a control pressure chamber; valve means for controlling the flow of air through an opening including a movable pressure sensitive control element subjected on one side to enclosure pressure and on the other side to control chamber pressure; and a pressure control means for said control chamber including pressure responsive means, responsive to control chamber pressure, adapted to control the pressure in said chamber.

9. In mechanism for controlling the pressure within an enclosure: a movable pressure sensitive control device subjected on one side to enclosure pressure, said movable pressure sensitive device having associated therewith a valve for controlling the flow of air through an opening in a wall of said enclosure; walls defining a control pressure chamber, the other side of said control device being subjected to pressure in said chamber; and a pressure control means for said control chamber including pressure responsive means, responsive to control chamber pressure, for controlling the pressure in said chamber.

10. Pressure control apparatus for a closed space having means to supply pressure to said space, comprising: a casing connected to said space; a valve seat for said casing; a variable pressure chamber in communication with said space by way of a pre-set bleed opening; a flexible diaphragm closing one side of said chamber and subjected at its opposite side to the pressure of said closed space, said diaphragm coacting with said seat to form a discharge valve for said space and actuated when pressure in said closed space differs by a predetermined amount from that in said chamber; a small air release valve for said chamber; an absolute pressure responsive unit in said chamber; a differential pressure responsive unit in said chamber, the first mentioned unit being sealed and subjected to the pressure in said space and the second mentioned unit being subjected externally to the pressure in said chamber and internally to the pressure of ambient air; a movable beam connected at its respective ends to said units and coacting at an intermediate point with said small valve for controlling the same; and a pre-set stop in said chamber coacting with the end of the beam connected to said first mentioned unit.

11. A pressure control apparatus for a closed space having means to supply pressure to said space, comprising: a casing connected to said space and having a valve seat; a variable pressure chamber in communication with said space by way of a pre-set bleed opening; a flexible diaphragm closing one side of said chamber and subjected at its opposite side to the pressure in said closed space, said diaphragm coacting with said seat to form a discharge valve for said space, said diaphragm being actuated when pressure in said closed space differs by a predetermined amount from that in said chamber; an air release valve for said chamber; an absolute pressure responsive unit responsive to the pressure in said chamber; a differential pressure responsive unit subjected externally to the pressure in said chamber and internally to the pressure of ambient air; and a beam connected at its respective ends to said units and coacting at an intermediate point with said air release valve for controlling same.

12. Pressure control apparatus for a closed pressurized space having an outlet and a valve seat therefor, comprising: a variable pressure chamber in communication with said space by way of a bleed opening; a flexible diaphragm closing one side of said chamber and subjected at its opposite side to the pressure of said closed space, said diaphragm coacting with said seat to form a discharge valve for said space and actuated when the pressure in said closed space differs from that in said chamber; an air release valve for said chamber; an absolute pressure responsive unit; a differential pressure responsive unit, the first unit being sealed and subjected to the pressure in said space and the second mentioned unit being subjected externally to the pressure in said chamber and internally to the pressure of the ambient air; and a beam connected at its respective ends to said units and coacting at an intermediate point with said air release valve.

13. Pressure control apparatus for a pressurized aircraft cabin having an outlet and a valve seat therefor, comprising: a variable pressure chamber in communication with said cabin by way of a pre-set bleed opening; a flexible diaphragm subjected on one side to the pressure in said chamber and on its opposite side to the pressure of said cabin, said diaphragm coacting with said seat to form a discharge valve for the cabin and actuated when the pressure in said cabin differs by a predetemined amount from that in said chamber; and air release valve for said chamber; an absolute pressure responsive unit subjected to the pressure in said chamber; a differential pressure responsive unit subjected on one side to chamber pressure and on the opposite side to ambient atmospheric pressure; and a beam connected adjacent its respective ends to said units and coacting with said air release valve for controlling the same.

14. Pressure control apparatus for a pressurized aircraft cabin having an outlet and a valve seat therefor, comprising: a variable pressure chamber in communication with said cabin by way of a bleed opening; a flexible diaphragm subjected on one side to the pressure in said chamber and on its opposite side to the pressure of said cabin, said diaphragm having associated therewith means coacting with said seat to form a discharge valve for the cabin which is actuated when the pressure in said cabin differs by a predetermined amount from that in said chamber; an air release valve for said chamber; and an absolute pressure responsive unit subjected to the pressure in said chamber for controlling said air release valve.

15. Mechanism for controlling the pressure within an aircraft cabin, comprising: movable means having a valve for controlling airflow through an opening in a wall of said cabin and having a movable pressure sensitive control element subjected on one side to cabin pressure; walls defining a control pressure chamber, the other side of said control element being subjected to pressure in said chamber; a connection between said chamber and a source of higher pressure; a connection between said chamber and a region of lower pressure; valve means controlling one of said connections; a device responsive to the absolute pressure in said control chamber; a device responsive to variations in the differential of pressure between the pressure in said control chamber and ambient atmospheric pressure; and means connecting said devices to said valve means for controlling said valve means.

16. A mechanism for controlling the pressure within an aircraft cabin, comprising: valve means for controlling the flow of air through an opening and including a movable pressure sensitive control element, a portion of one side of said element being subjected to cabin pressure and the remaining portion of said side being subjected to ambient atmospheric pressure; walls defining a control pressure chamber, the other side of said control element being subjected to the pressure in said chamber over an area of substantially the same size as the combined areas subjected to cabin pressure and ambient atmospheric pressure; a connection between said chamber and a source of higher pressure; a connection between said chamber and a region of lower pressure; a valve controlling one of said connections; and a device responsive to the pressure in said control chamber for controlling said valve and thereby controlling the pressure in said chamber.

17. In mechanism for controlling the pressure in a pressurized aircraft cabin, comprising: means forming an outlet for the outflow of air from the cabin; a movable wall for controlling the flow of air through said outlet; walls forming, in cooperation with said movable wall, a control pressure chamber so that said movable wall is subjected on one side to the pressure in said chamber, portions of the other side of said movable wall being subjected to cabin pressure and atmospheric pressure respectively; an inlet connection to said control chamber from a source of higher pressure; an outlet connection from said control chamber to a region of lower pressure; and a pressure sensitive device subject to the pressure within said control chamber for controlling flow through one of said connections for controlling the pressure in said control chamber.

18. In a mechanism for controlling the air pressure in an airplane cabin while permitting a continued circulation of air through the cabin: means forming an outlet for the escape of air from the cabin, an outwardly opening valve controlling the escape of air through said outlet, walls cooperating with the outer side of said valve to form a control chamber therewith in which there may be maintained air under pressure tending to close said valve, the inner side of said valve being exposed to the cabin pressure tending to open the valve, an outlet for the escape of air from said control chamber to atmosphere, and a valve having associated therewith means, sensitive to a predetermined differential in pressure in said chamber over ambient pressure, adapted, when ambient pressure has dropped sufficiently to produce said differential, to permit the escape of air from said control chamber sufficiently to maintain said differential, and hence a fixed differential of cabin pressure over ambient pressure.

19. In a mechanism for controlling the air pressure in an airplane cabin while permitting a continued circulation of air through the cabin: means forming an outlet for the escape of air from the cabin, a valve for controlling the flow of the air through said outlet, diaphragm means connected to said valve and permitting movement thereof, walls cooperating with said diaphragm means to define therewith a control chamber, said valve being arranged to respond to the changes in pressure in said control chamber, and to maintain a pressure in said cabin at a value having a substantially fixed relation to said control chamber pressure, and a valve having associated therewith means, sensitive to a predetermined differential between pressure in said chamber and ambient pressure, adapted, when ambient pressure has dropped sufficiently to produce said differential, to permit the escape of air from said control chamber to atmosphere sufficiently to maintain said differential, and hence a fixed differential of cabin pressure over ambient pressure.

20. A regulator for controlling the outflow of air from an airplane cabin while permitting the forcible circulation of air through said cabin, said regulator comprising: means defining an outlet passage to atmosphere having an outlet port provided with an outwardly facing valve seat, said valve port being of a size to handle the circulation of air through said cabin, an outwardly opening valve cooperating with said seat to control the outflow of air through said port, means cooperating with said valve to define, with the outer face thereof, a control chamber in which may be maintained air under pressure tending to close said valve, the inner side of said valve being exposed to the pressure in said cabin, tending to open it, a light spring yieldably urging said valve toward said seat and adapted to yield to a small differential in pressure in said cabin over pressure in said control chamber, whereby to permit said valve to open to pass the circulating air, and pilot valve means sensitive to changes in ambient pressure, for controlling the pressure in said control chamber and thereby controlling the pressure in said cabin.

21. Mechanism for controlling the air pressure in a cabin including: cabin pressure control means operable to control the pressure in said cabin, said pressure control means including a pressure sensitive element; a control chamber, said pressure sensitive element being exposed both to cabin pressure and control chamber pressure in such a manner that changes in either of said pressures cause a movement of said pressure sensitive element whereby said cabin pressure control means is operated to control said cabin pressure; means providing restricted air flow into said control chamber from a source of higher pressure; means connecting said control chamber to a lower pressure region; and means responsive to control chamber pressure for controlling the escape of air from said control chamber through said connecting means for controlling the pressure in said control chamber.

22. Mechanism for controlling the air pressure in a cabin including: cabin pressure control means operable to control the pressure in said cabin, said pressure control means including a pressure sensitive element, a control chamber, said pressure sensitive element being exposed both to cabin pressure and control chamber pressure in such a manner that changes in either of said pressures cause a movement of said pressure sensitive element whereby said cabin pressure control means is operated to control said cabin pressure; means connecting said control chamber to a source of higher pressure; means connecting said control chamber to a lower pressure region; and absolute pressure responsive means responsive to control chamber pressure for controlling the escape of air from said control chamber through said connecting means for controlling the pressure in said control chamber.

23. Mechanism for controlling the air pressure in a cabin including: cabin pressure control means operable to control the pressure in said cabin, said pressure control means including a pressure sensitive element; a control chamber, said pressure sensitive element being exposed both to cabin pressure and control chamber pressure in such a manner that changes in either of said pressures cause a movement of said pressure sensitive element whereby said cabin pressure control means is operated to control said cabin pressure; means providing restricted air flow between said cabin and said control chamber; means connecting said control chamber to a lower pressure region; and absolute pressure responsive means subjected to control chamber pressure for controlling the flow of air through one of said connecting means for controlling the pressure in said control chamber.

24. Mechanism for controlling the air pressure in a cabin including: cabin pressure control means operable to control the pressure in said cabin, said pressure control means including a pressure sensitive element; a control chamber; and differential pressure responsive means subjected to chamber pressure and to ambient pressure for controlling the differential pressure between control chamber pressure and atmosphere, said pressure sensitive element being exposed to both cabin pressure and control chamber pressure in such a manner that changes in either of said pressures cause a movement of said pressure sensitive element whereby said pressure control means is operated to control said cabin pressure.

25. Mechanism for controlling the air pressure in a cabin including: cabin pressure control means operable to control the pressure in said cabin, said pressure control means including a pressure sensitive element; a control chamber including said pressure sensitive element; pressure control means for said control chamber including pressure responsive means responsive to control chamber pressure for controlling the pressure in said control chamber; and means for preventing the control chamber pressure from exceeding ambient pressure by more than a predetermined value, said pressure sensitive element being exposed both to cabin pressure and control chamber pressure in such a manner that changes in either of said pressures cause a movement of said pressure sensitive element whereby said cabin pressure control means is operated to control said cabin pressure.

26. Mechanism for controlling the air pressure in a cabin including: cabin pressure control means operable to control the pressure in said cabin, said pressure control means including a pressure sensitive element; a control chamber; means for bleeding air into the control chamber from the cabin; means connecting said control chamber to a lower pressure region; and differential pressure responsive means responsive to control chamber pressure and ambient pressure for controlling the escape of air from said control chamber through said connecting means for controlling the pressure in said control chamber, said pressure sensitive element being exposed both to cabin pressure and control chamber pressure in such a manner that changes in either of said pressures cause a movement of said pressure sensitive element whereby said cabin pressure control means is operated to control said cabin pressure.

27. Mechanism for controlling the air pressure in a cabin including: cabin pressure control means operable to control the pressure in said cabin, said pressure control means including a pressure sensitive element; a control chamber; means providing air flow into the control chamber from a source of higher pressure; means connecting said control chamber to a lower pressure region; and means responsive to control chamber pressure for controlling the escape of air from said control chamber to said connecting means for controlling the pressure in said control chamber, said pressure sensitive element being exposed both to cabin pressure and control chamber pressure in such a manner that changes in either of said pressures cause a movement of said pressure sensitive element whereby said cabin pressure control means is operated to control said cabin pressure.

28. Mechanism for controlling the air pressure in a cabin including: cabin pressure control means operable to control the pressure in said cabin, said pressure control means including a pressure sensitive element; a control chamber including said pressure responsive element; means providing air flow between said cabin and said control chamber; means connecting said control chamber to a lower pressure region; and means responsive to the differential of pressure between said control chamber and said region of lower pressure for controlling the escape of air from said control chamber through said connecting means for controlling the pressure in said control chamber, said pressure sensitive element being exposed both to cabin pressure and control chamber pressure in such a manner that changes in either of said pressures cause a movement of said pressure sensitive element whereby said cabin pressure control means is operated to control said cabin pressure.

29. A regulator for controlling the outflow of air from an airplane cabin comprising: means defining an outlet passage to atmosphere having an outlet port provided with an outwardly facing valve seat, an outwardly opening valve cooperating with said seat to control the outflow of air through said port, a spring yieldably urging said valve toward said seat, diaphragm means connected to said valve and permitting movement thereof, a casing connected to said diaphragm means to define a control chamber therewith, said valve being subjected to cabin pressure on one side thereof and to control chamber pressure on the other side thereof, orifice means providing restricted air flow between said cabin and said control chamber, a pilot valve and a duct providing escape of air from said control chamber to atmosphere, and a bellows in said control chamber responsive to the absolute pressure therein and operatively connected to said pilot valve to adjust the position thereof.

30. A regulator for controlling the outflow of air from an airplane cabin comprising: means defining an outlet passage to atmosphere having an outlet port provided with an outwardly facing valve seat, an outwardly opening valve cooperating with said seat to control the outflow of air through said port, a spring yieldably urging said valve toward said seat, diaphragm means connected to said valve and permitting movement thereof, a casing connected to said diaphragm means to define a control chamber therewith, said valve being subjected to cabin pressure on one side thereof and to control chamber pressure on the other side thereof, orifice means providing restricted air flow between said cabin and said control chamber, a duct providing for the escape of air from said control chamber to atmosphere, and pilot valve means responsive to the joint action of control chamber pressure and atmospheric pressure for regulating the flow of air through said duct.

31. A regulator for controlling the outflow of air from an airplane cabin comprising: means defining an outlet passage to atmosphere having an outlet port provided with an outwardly facing valve seat, an outwardly opening valve cooperating with said seat to control the outflow of air through said port, a spring yieldably urging said valve toward said seat, diaphragm means connected to said valve and permitting movement thereof, a casing connected to said diaphragm means to define a control chamber therewith, said valve being subjected to cabin pressure on one side thereof and to control chamber pressure on the other side thereof, orifice means providing restricted air flow between said cabin and said control chamber, duct means providing for the escape of air from said control chamber to atmosphere, and pilot valve means responsive to the absolute pressure in said control chamber, and responsive to the joint action of control chamber pressure and atmospheric pressure, cooperating with said duct means to regulate air flow therethrough.

32. Mechanism for controlling the air pressure in a cabin including: cabin pressure control means operable to control the pressure in said cabin, said pressure control means including a pressure sensitive element; a control chamber, said pressure sensitive element being exposed both to cabin pressure and control chamber pressure in such a manner that changes in either of said pressures cause a movement of said pressure sensitive element whereby said cabin pressure control means is operated to control said cabin pressure; and pressure control means for said control chamber, including pressure responsive means, responsive to control chamber pressure and adapted to control the pressure in said control chamber.

33. In mechanism for controlling the pressure within an aircraft cabin: cabin pressure control means operable to control the pressure in said cabin, including a movable pressure sensitive control element subjected on one side to cabin pressure; walls defining a control pressure chamber, the other side of said control element being subjected to pressure in said chamber; a connection between said chamber and a region of higher pressure; a connection between said chamber and a region of lower pressure; a valve controlling one of said connections; and a device responsive to the differential between the pressure in said control chamber and the pressure on the exterior of said aircraft cabin for controlling said valve and thereby controlling the pressure in said chamber.

34. In mechanism for controlling the pressure within an enclosure; walls defining a control pressure chamber; valve means for controlling the flow of air through an opening including a movable pressure sensitive control element subjected on one side to enclosure pressure and on the other side to control chamber pressure; and pressure control means for said control chamber including a pressure responsive means responsive to the differential between control chamber pressure and the pressure exterior of said enclosure adapted to control the pressure in said chamber.

35. In mechanism for controlling the pressure within an enclosure: walls defining a control pressure chamber; valve means for controlling the flow of air through an opening including a movable pressure sensitive control element subjected on one side to enclosure pressure and on the other side to control chamber pressure; and pressure control means for said control chamber including a pressure responsive means responsive to control chamber pressure, and a second pressure responsive means responsive to the differential between control chamber pressure and the pressure external of said enclosure, said two pressure responsive means being adapted jointly to control the pressure in said chamber.

36. Mechanism for controlling the air pressure in a cabin which has an air outlet, the combination including: valve means for controlling the flow of air through said outlet including a movable pressure sensitive control element, a portion of one side of said element being subjected to cabin pressure and another portion of said side being subjected to ambient atmospheric pressure; a control pressure chamber, the other side of said control element being subjected to the pressure in said chamber whereby said control element is positioned with respect to said opening of said cabin by the balancing or unbalancing of pressures on the opposite sides of said movable pressure sensitive control element; a connection adapted to connect said chamber to a source of higher pressure; a connection adapted to connect said chamber to a region of lower pressure; and a valve for controlling one of said connections whereby the pressure in said control chamber may be controlled in a manner to position said valve means in order to obtain the desired pressure in said cabin.

37. Mechanism for controlling the air pressure in a cabin which has walls forming a valve opening connecting the cabin interior with the exterior, said mechanism including: valve means adapted to cooperate with said valve opening for controlling the flow of air therethrough, said valve means including a pressure sensitive element, one side of which is exposed to cabin pressure and to ambient atmospheric pressure; walls cooperating with said pressure sensitive element to form a control chamber, one side of said pressure sensitive element being exposed to the pressure in said control chamber; a connection between said control chamber and a source of higher pressure; a connection between said control chamber and a region of lower pressure; a valve for controlling one of said connection; and means for controlling said valve to control the pressure in said control chamber, said pressure sensitive element being positioned by differentials in pressures on opposite sides thereof to position said valve means to control the pressure in said cabin.

38. In mechanism for controlling the pressure within an enclosure: walls defining a control pressure chamber; valve means for controlling the flow of air through an opening in said enclosure including a movable pressure sensitive control element subjected on one side to enclosure pressure and on the other side to control chamber pressure; passage means whereby fluid may flow into and from said control chamber; a valve for controlling said passage means; and pressure control means for said control chamber including pressure responsive means responsive to control chamber pressure for controlling the operation of said valve.

39. In a fluid flow control mechanism for an enclosure having a passage for the flow of fluid to be controlled, the combination of: valve means for controlling the flow of fluid through said passage; a control chamber adapted to have fluid under pressure therein; said valve means having a pressure responsive element positioned so as to be subjected on one side to control chamber pressure and on the other side to enclosure pressure; and pressure control means for said control chamber responsive to control chamber pressure for controlling the pressure in said control chamber whereby fluctuations in enclosure pressure cause said valve to move so as to control the flow of fluid through said passage.

40. In a pressure control mechanism for controlling the pressure in an enclosure, the combination of: a control chamber; a movable wall having associated therewith valve means for controlling an outlet passage of said enclosure, said wall means being subjected to chamber pressure on one side and enclosure pressure on the other side whereby a change in either of said pressures will move said movable wall; and pressure control means for said control chamber including means responsive to control chamber pressure for controlling the pressure in said control chamber.

41. In mechanism for controlling the pressure in an enclosure: walls defining a control pressure chamber; a movable pressure sensitive control element subjected on one side to enclosure pressure and on the other side to control chamber pressure; and pressure control means for said control chamber including pressure responsive means responsive to control chamber pressure adapted to control the pressure in said chamber.

42. A method of controlling the position of an outflow valve means having a movable wall, for controlling the pressure in an enclosure by controlling the outflow therefrom comprising the steps of: subjecting one side of the movable wall to the pressure in the enclosure and the other side of the movable wall to a control pressure so that said movable wall is caused to move upon a change in either of said pressures and thereby change the position of the outflow valve means; and maintaining said control pressure independently of enclosure pressure and at such a value that outflow from said enclosure will be controlled by pressure fluctuations in enclosure pressure acting against the movable wall to move the movable wall and outflow valve means.

43. A method of controlling the position of a valve means having a movable wall, for controlling the pressure in an enclosure by controlling the outflow therefrom comprising the steps of: subjecting one side of the movable wall to the pressure in the enclosure and the other side of the movable wall to a control pressure so that said movable wall is caused to move upon a change in either of said pressures and thereby change the position of the valve means; and maintaining control pressure at a predetermined constant differential to pressure outside the enclosure so that pressure fluctuations in enclosure pressure acting against the movable wall will move the movable wall and position the valve means so as to control the pressure in the enclosure.

44. In mechanism for controlling the pressure in an enclosure: walls defining a control pressure chamber; a movable pressure sensitive control element subjected on one side to enclosure pressure and on the other side to control chamber pressure; and pressure control means for said control chamber including pressure responsive means having one side subjected to control chamber pressure adapted to control the pressure in said chamber.

S. T. A. RICHARDS.
W. M. WIDGERY.

REFERENCES CITED

The following references are of record in the file of this patent:

UNITED STATES PATENTS

| Number | Name | Date |
|---|---|---|
| 2,407,257 | Del Mar | Sept. 10, 1946 |
| 2,419,707 | Cooper et al. | Apr. 29, 1947 |